US012776329B2

(12) United States Patent
Dieleman

(10) Patent No.: US 12,776,329 B2
(45) Date of Patent: Oct. 27, 2026

(54) GENERATING OUTPUT SIGNALS USING VARIABLE-RATE DISCRETE REPRESENTATIONS

(71) Applicant: GDM Holding LLC, Mountain View, CA (US)

(72) Inventor: Sander Etienne Lea Dieleman, London (GB)

(73) Assignee: GDM Holding LLC, Mountain View, CA (US)

( * ) Notice: Subject to any disclaimer, the term of this patent is extended or adjusted under 35 U.S.C. 154(b) by 323 days.

(21) Appl. No.: 18/281,041

(22) PCT Filed: Mar. 9, 2022

(86) PCT No.: PCT/EP2022/056014
§ 371 (c)(1),
(2) Date: Sep. 8, 2023

(87) PCT Pub. No.: WO2022/189493
PCT Pub. Date: Sep. 15, 2022

(65) Prior Publication Data
US 2024/0144944 A1 May 2, 2024

Related U.S. Application Data

(60) Provisional application No. 63/158,876, filed on Mar. 9, 2021.

(51) Int. Cl.
*G06N 3/08* (2023.01)
*G06N 5/02* (2023.01)
(Continued)

(52) U.S. Cl.
CPC ................ *G10L 19/04* (2013.01); *G06N 5/02* (2013.01); *G10L 25/30* (2013.01)

(58) Field of Classification Search
CPC .......... G10L 19/04; G06N 3/08; G06N 20/00; G06N 3/0474; G06N 5/02
(Continued)

(56) References Cited

U.S. PATENT DOCUMENTS 11,915,689 B1 * 2/2024 Agostinelli ............. G10L 15/16
12,330,047 B2 * 6/2025 Khare .................... G16H 50/30
(Continued)

FOREIGN PATENT DOCUMENTS

CN 110612538 A 12/2019
JP 2012128022 A * 7/2012
KR 20140143438 A * 12/2014 ........... G10L 19/002

OTHER PUBLICATIONS

H. Purwins, B. Li, T. Virtanen, J. Schlüter, S. -Y. Chang and T. Sainath, "Deep Learning for Audio Signal Processing," in IEEE Journal of Selected Topics in Signal Processing, vol. 13, No. 2, pp. 206-219, May 2019, doi: 10.1109/JSTSP.2019.2908700. keywords: {Deep learning;Task analysis;Convolution;Co (Year: 2019).*
(Continued)

*Primary Examiner* — Jialong He
(74) *Attorney, Agent, or Firm* — Fish & Richardson P.C.

(57) ABSTRACT

Methods, systems, and apparatus, including computer programs encoded on computer storage media, for generating output signals using variable-rate discrete representations. One of the methods includes generating, using a generative neural network, an event sequence representing a run-length encoding of a discrete representation of the audio signal, the event sequence comprising a respective event at each of a plurality of event sequence time steps; generating the discrete representation of the audio signal from the event sequence using run-length decoding; and processing the discrete representation using a decoder neural network, wherein the decoder neural network is configured to process
(Continued)

the discrete representation of the audio signal to generate the prediction of the audio signal.

37 Claims, 6 Drawing Sheets

(51) Int. Cl.
*G06N 20/00* (2019.01)
*G10L 19/04* (2013.01)
*G10L 25/30* (2013.01)

(58) Field of Classification Search
USPC .......................................................... 704/200
See application file for complete search history.

(56) References Cited

U.S. PATENT DOCUMENTS

2007/0016406 A1* 1/2007 Thumpudi ............ G10L 19/008 704/E19.02
2020/0176004 A1* 6/2020 Kleijn ..................... G10L 19/00
2023/0368804 A1* 11/2023 Kleijn ..................... G10L 25/30

OTHER PUBLICATIONS

Van Den Oord, Aaron, and Oriol Vinyals. "Neural discrete representation learning." Advances in neural information processing systems 30 (2017). (Year: 2017).*
Bai, Junwen, et al. "Representation learning for sequence data with deep auto-encoding predictive components." arXiv preprint arXiv:2010.03135 (2021). (Year: 2021).*
Run-length Encoding, Wikipedia, Archived Mar. 2020. (Year: 2020).*
Office Action in European Appln. No. 22714373.2, mailed on Mar. 19, 2025, 4 pages.
Abadi et al., "TensorFlow: a system for Large-Scale machine learning," In 12th Usenix symposium on operating systems design and implementation (OSDI 16), 2016, p. 265-283.
Baevski et al., "Adaptive input representations for neural language modeling," CoRR, submitted on Feb. 22, 2019, arXiv:1809.10853v3, 13 pages.
Baevski et al., "vq-wav2vec: Self-supervised learning of discrete speech representations," CoRR, submitted on Feb. 16, 2020, arXiv:1910.05453v3, 12 pages.
Balle et al., "End-to-end optimized image compression," CoRR, submitted on Mar. 3, 2017, arXiv:1611.01704v3, 27 pages.
Bengio et al., "Estimating or propagating gradients through stochastic neurons for conditional computation," CoRR, submitted on Aug. 15, 2013, arXiv:1308.3432v1, 12 pages.
Bengio et al., "Scheduled sampling for sequence prediction with recurrent neural networks," Advances in neural information processing systems, 2015, 9 pages.
Binkowski et al., "Autoregressive convolutional neural networks for asynchronous time series," In International Conference on Machine Learning, Jul. 3, 2018, p. 580-589.
Binkowski et al., "High Fidelity speech synthesis with adversarial networks," CoRR, submitted on Sep. 26, 2019, arXiv:1909.11646v2, 15 pages.
Bowman et al., "Generating sentences from a continuous space," CoRR, submitted on May 12, 2016, arXiv:1511.06349v4, 12 pages.
Brown et al., "Language models are few-shot learners," Advances in neural information processing systems, 2020, 33:1877-901.
Burgess et al., "Monet: Unsupervised scene decomposition and representation," CoRR, submitted on Jan. 22, 2019, arXiv:1901.11390v1, 22 pages.
Campos et al., "Skip mn: Learning to skip state updates in recurrent neural networks," CoRR, submitted on Feb. 5, 2018, arXiv:1708.06834v3, 17 pages.
Chen et al., "Variational lossy autoencoder," CoRR, submitted on Mar. 4, 2017, arXiv:1611.02731v2, 17 pages.
Chorowski et al., "Unsupervised speech representation learning using wavenet autoencoders," IEEE/ACM transactions on audio, speech, and language processing, Sep. 2, 2019, 27(12):2041-53.
Cote et al., "An infinite restricted Boltzmann machine," CoRR, submitted on Mar. 18, 2016, arXiv:1502.02476v4, 25 pages.
Dhariwal et al., "Jukebox: A generative model for music," CoRR, submitted on Apr. 30, 2020, arXiv:2005.00341v1, 20 pages.
Dieleman et al., "The challenge of realistic music generation: modelling raw audio at scale," Advances in neural information processing systems, 2018, 11 pages.
Eslami et al., "Attend, infer, repeat: Fast scene understanding with generative models," Advances in neural information processing systems, 2016, 9 pages.
Fauw et al., "Hierarchical autoregressive image models with auxiliary decoders," CoRR, submitted on Oct. 8, 2019, arXiv:1903.04933v2, 32 pages.
fer.unizg.hr [online], "The unreasonable effectiveness of recurrent neural networks," May 21, 2015, retrieved on Mar. 8, 2020, retrieved from URL <https://www.fer.unizg.hr/_download/repository/TAR-2020-reading-06.pdf>, 29 pages.
Figurnov et al., "Spatially adaptive computation time for residual networks," In Proceedings of the IEEE conference on computer vision and pattern recognition, 2017, p. 1039-1048.
Fortuin et al., "Som-vae: Interpretable discrete representation learning on time series," CoRR, submitted on Jan. 4, 2019, arXiv:1806.02199v7, 18 pages.
Gallego et al., "Event-based vision: A survey," CoRR, submitted on Feb. 26, 2020, arXiv:1904.08405v2, 31 pages.
github.com [online], "JAX: composable transformations of Python + NumPy programs," available on or before Nov. 22, 2018, Internet Archive: Wayback Machine URL <https://web.archive.org/web/20240000000000*/https://github.com/google/jax>, retrieved on Mar. 8, 2024, URL<https://github.com/google/jax>, 8 pages.
Graves et al., "Connectionist temporal classification: labelling unsegmented sequence data with recurrent neural networks," In Proceedings of the 23rd international conference on Machine learning, Jun. 25, 2006, p. 369-376.
Graves, "Adaptive computation time for recurrent neural networks," CoRR, submitted on Feb. 21, 2017, arXiv:1603.08983v6, 19 pages.
Gray et al., "Quantization," IEEE transactions on information theory, 1998, 44(6):2325-2383.
Greff et al., "Multi-object representation learning with iterative variational inference," In International Conference on Machine Learning, May 24, 2019, p. 2424-2433.
Griffiths et al., "Infinite latent feature models and the Indian buffet process," Advances in neural information processing systems, 2005, 8 pages.
Gueguen et al., "Faster neural networks straight from jpeg," Advances in Neural Information Processing Systems, 2018, 12 pages.
Hadjeres et al., "Vector quantized contrastive predictive coding for template-based music generation," CoRR, submitted on Apr. 21, 2020, arXiv:2004.10120v1, 15 pages.
Harris et al., "Array programming with NumPy," Nature, Sep. 2020, 585(7825):357-362.
Hayashi et al., "Discretalk: Text-to-speech as a machine translation problem," CoRR, submitted on May 12, 2020, arXiv:2005.05525v1, 5 pages.
Holtzman et al., "The curious case of neural text degeneration," CoRR, submitted on Feb. 14, 2020, arXiv: 1904.09751v2, 16 pages.
Hu et al., "Group sparse optimization via lp, q regularization," The Journal of Machine Learning Research, Jan. 1, 2017, 18(1):960-1011.
Huang et al., "Music transformer: Ceneratng music with long-term structure," CoRR, submitted on Dec. 12, 2018, arXiv:1809.04281v3, 14 pages.
Hunter, "Matplotlib: A 2D graphics environment," Computing in science & engineering, May 1, 2007, 9(03):90-5 (abstract only).
International Preliminary Report on Patentability in Appln. No. PCT/EP2022/056014, mailed on Sep. 21, 2023, 12 pages.
International Search Report and Written Opinion in Appln. No. PCT/EP2022/056014, mailed on Sep. 19, 2022, 18 pages.
Jang et al., "Categorical reparameterization with gumbel-softmax," CoRR, submitted on Aug. 5, 2017, arXiv:1611.01144v5, 13 pages.

(56) References Cited

OTHER PUBLICATIONS

Ji et al., "Invariant information clustering for unsupervised image classification and segmentation," In Proceedings of the IEEE/CVF international conference on computer vision, 2019, p. 9865-9874.
Kahn et al., "Libri-light: A benchmark for asr with limited or no supervision," CoRR, submitted on Dec. 17, 2019, arXiv:1912.07875v1, 7 pages.
Kavukcuoglu et al., "Learning invariant features through topographic filter maps," In 2009 IEEE conference on computer vision and pattern recognition, Jun. 20, 2009, p. 1605-1612.
Khurana et al., "A convolutional deep markov model for unsupervised speech representation learning," In Interspeech, 2020, 5 pages.
Kingma et al., "Adam: A method for stochastic optimization," CoRR, submitted on Jan. 30, 2017, arXiv:1412.6980v9, 15 pages.
Kingma et al., "Auto-encoding variational bayes," CoRR, submitted on Dec. 10, 2022, arXiv:1312.6114v11, 14 pages.
Kirillov et al., "Pointrend: Image segmentation as rendering," In Proceedings of the IEEE/CVF conference on computer vision and pattern recognition, 2020, p. 9799-9808.
Kleijn et al., "Generative speech coding with predictive variance regularization," In ICASSP 2021-2021 IEEE International Conference on Acoustics, Speech and Signal Processing (ICASSP), Jun. 6, 2021, p. 6478-6482.
Klindt et al., "Towards nonlinear disentanglement in natural data with temporal sparse coding," CoRR, submitted on Mar. 17, 2021, arXiv:2007.10930v2, 51 pages.
Kudo et al., "Sentencepiece: A simple and language independent subword tokenizer and detokenizer for neural text processing," CoRR, submitted on Aug. 19, 2018, arXiv:1808.06226v1, 6 pages.
Lakhotia et al., "On generative spoken language modeling from raw audio," Transactions of the Association for Computational Linguistics, Dec. 6, 2021, 9:1336-54.
Locatello et al., "Object-centric learning with slot attention," Advances in Neural Information Processing Systems, 2020, 33:11525-38.
Loshchilov et al., "Sgdr: Stochastic gradient descent with warm restarts," CoRR, submitted on May 3, 2017, arXiv:1608.03983v5, 16 pages.
Lugosch et al., "Surprisal-triggered conditional computation with neural networks," CoRR, submitted on Jun. 2, 2020, arXiv:2006.01659v1, 16 pages.
Maddison et al., "The concrete distribution: A continuous relaxation of discrete random variables," CoRR, submitted on Mar. 5, 2017, arXiv:1611.00712v3, 20 pages.
Malinowski et al., "Learning visual question answering by bootstrapping hard attention," In Proceedings of the European Conference on Computer Vision (ECCV), 2018, p. 3-20.
Marin et al., "Efficient segmentation: Learning downsampling near semantic boundaries," In Proceedings of the IEEE/CVF international conference on computer vision, 2019, p. 2131-2141.
McFee et al., "librosa: Audio and music signal analysis in python," In Proceedings of the 14th python in science conference, Jul. 6, 2015, p. 18-25.
Menick et al., "Generating high fidelity images with subscale pixel networks and multidimensional upscaling," CoRR, submitted on Dec. 4, 2018, arXiv:1812.01608v1, 15 pages.
Merity et al., "Pointer sentinel mixture models," CoRR, submitted on Sep. 26, 2016, arXiv:1609.07843v1, 13 pages.
Michel et al., "Blind phoneme segmentation with temporal prediction errors," CoRR, submitted on May 27, 2017, arXiv:1608.00508v2, 7 pages.
Mozer et al., "Discrete event, continuous-time Recurrent Nets," CoRR, submitted on Oct. 11, 2017, arXiv:1710.04110v1, 21 pages.
Nalisnick et al., "Stick-breaking variational autoencoders," CoRR, submitted on Apr. 3, 2017, arXiv:1605.06197v3, 12 pages.
Nash et al., "Generating images with sparse representations," CoRR, submitted on Mar. 5, 2021, arXiv:2103.03841v1, 18 pages.
Neil et al., "Phased lstm: Accelerating recurrent network training for long or event-based sequences," Advances in neural information processing systems, 2016, 9 pages.
Oord et al., "Neural discrete representation learning," Advances in neural information processing systems, 2017, 10 pages.
Oord et al., "Representation learning with contrastive predictive coding," CoRR, submitted on Jan. 22, 2019, arXiv:1807.03748v2, 13 pages.
Oord et al., "Wavenet: A generative model for raw audio," CoRR, submitted on Sep. 19, 2016, arXiv:1609.03499v2, 15 pages.
Oore et al., "This time with feeling: Learning expressive musical performance," Neural Computing and Applications, Feb. 2020, 32:955-67.
openai.com [online], "MuseNet," available on or before Feb. 27, 2023, via Internet Archive: Wayback Machine URL<https://web.archive.org/web/20240000000000*/https://openai.com/research/musenet>, retrieved on Mar. 8, 2024, URL<https://openai.com/research/musenet>, 16 pages.
Parisotto et al., "Stabilizing transformers for reinforcement learning," In International conference on machine learning, Nov. 21, 2020, p. 7487-7498.
Polyak et al., "Acceleration of stochastic approximation by averaging," SIAM journal on control and optimization, Jul. 1992, 30(4):838-55.
Radford et al., "Language models are unsupervised multitask learners," OpenAI blog, Feb. 24, 2019, 1(8):9.
Rajbhandari et al., "Zero: Memory optimizations toward training trillion parameter models," CoRR, submitted on May 13, 2020, arXiv:1910.02054v3, 24 pages.
Ramesh et al., "Zero-shot text-to-image generation," CoRR, submitted on Feb. 26, 2021, arXiv:2102.12092v2, 20 pages.
Ranzato et al., "Sequence level training with recurrent neural networks," CoRR, submitted on May 6, 2016, arXiv:1511.06732v7, 16 pages.
Razavi et al., "Generating diverse high-fidelity images with vq-vae-2," Advances in neural information processing systems, 2019, 11 pages.
Razavi et al., "Preventing posterior collapse with delta-vaes," CoRR, submitted on Jan. 10, 2019, arXiv:1901.03416v1, 24 pages.
Rezende et al., "Stochastic backpropagation and approximate inference in deep generative models," In International conference on machine learning, Jun. 18, 2014, p. 1278-1286.
Rezende et al., "Taming VAEs," CoRR, submitted on Oct. 1, 2018, arXiv:1810.00597v1, 21 pages.
Rippel et al., "Learning ordered representations with nested dropout," In International Conference on Machine Learning, Jun. 18, 2014, p. 1746-1754.
Robinson et al., "Results of a prototype television bandwidth compression scheme," Proceedings of the IEEE, Mar. 1967, 55(3):356-64.
Rolfe, "Discrete variational autoencoders," CoRR, submitted on Apr. 22, 2017, arXiv:1609.02200v2, 33 pages.
Rubanova et al., "Latent ordinary differential equations for irregularly-sampled time series," Advances in neural information processing systems, 2019, 11 pages.
Rudin et al., "Nonlinear total variation based noise removal algorithms," Physica D: nonlinear phenomena, Nov. 1, 1992, 60(1-4):259-68.
Scharwächter et al., "Differentiable Segmentation of Sequences," CoRR, submitted on Jan. 18, 2021, arXiv:2006.13105v2, 17 pages.
Schmidhuber et al., "Neural sequence chunkers," Technical report, 1991, 17 pages.
Schmitt, "A thermionic trigger," Journal of Scientific instruments, 1938, 15(1):24.
Sennrich et al., "Neural machine translation of rare words with subword units," CoRR, submitted on Jun. 10, 2016, arXiv:1508.07909v5, 11 pages.
Shaw et al., "Self-attention with relative position representations," CoRR, submitted on Apr. 12, 2018, arXiv:1803.02155v2, 5 pages.
Shukla et al., "Interpolation-prediction networks for irregularly sampled time series," CoRR, submitted on Sep. 13, 2019, arXiv:1909.07782v1, 14 pages.
Silver et al., "Mastering the game of Go with deep neural networks and tree search," nature, Jan. 2016, 529(7587):484-9.
sourceforge.net [online], "SoX—Sound exchange," available on or before Apr. 13, 2001, via Internet Archive: Wayback Machine

(56) References Cited

OTHER PUBLICATIONS

URL<https://web.archive.org/web/20240000000000*/https://sourceforge.net/projects/sox/>, retrieved on Mar. 8, 2024, URL<https://sourceforge.net/projects/sox/>, 4 pages.
Sun et al., "Videobert: A joint model for video and language representation learning," In ICCV, 2019, 10 pages.
Sutton, "The bitter lesson," Incomplete Ideas, Mar. 13, 2019, 13(1):38.
Tavanaei et al., "Representation learning using event-based STDP," Neural Networks, Sep. 1, 2018, 105:294-303.
tensorflow.org [online], "Performance RNN: Generating Music with Expressive Timing and Dynamics," Jun. 29, 2017, retrieved on Mar. 8, 2024, retrieved from URL<https://magenta.tensorflow.org/performance-rnn>, 7 pages.
Theis et al., "Lossy image compression with compressive autoencoders," In International Conference on Learning Representations, Nov. 4, 2016, 19 pages.
Turner et al., "A maximum-likelihood interpretation for slow feature analysis," Neural computation, Apr. 1, 2007, 19(4):1022-38.
Vaswani et al., "Attention is all you need," Advances in neural information processing systems, 2017, 11 pages.
Virtanen et al., "SciPy 1.0: fundamental algorithms for scientific computing in Python," Nature methods, Mar. 2020, 17(3):261-72.
Wiskott et al., "Slow feature analysis: Unsupervised learning of invariances," Neural computation, Apr. 1, 2002, 14(4):715-70.
Wu et al., "Compressed video action recognition," In Proceedings of the IEEE conference on computer vision and pattern recognition, 2018, p. 6026-6035.
Wu et al., "Modeling asynchronous event sequences with RNNs," Journal of biomedical informatics, Jul. 1, 2018, 83:167-77.
Wu et al., "Visual transformers: Tokenbased image representation and processing for computer vision," CoRR, submitted on Nov. 20, 2020, arXiv:2006.03677v4, 12 pages.
Yang et al., "XInet: Generalized autoregressive pretraining for language understanding," Advances in neural information processing systems, 2019, 11 pages.
Yeung et al., "End-to-end learning of action detection from frame glimpses in videos," In Proceedings of the IEEE conference on computer vision and pattern recognition, 2016, p. 2678-2687.
Zen et al., "Libritts: A corpus derived from librispeech for text-to-speech," CoRR, submitted on Apr. 5, 2019, arXiv:1904.02882v1, 7 pages.
Zhang et al., "GAZEV:GAN-based Zero-shot voice conversion over non-parallel speech corpus," CoRR, submitted on Oct. 24, 2020, arXiv:2010.12788v1, 5 pages.
Zhang et al., "Uwspeech: Speech to speech translation for unwritten languages," In Proceedings of the AAAI Conference on Artificial Intelligence, May 18, 2021, p. 14319-14327.
Zou et al., "Regularization and variable selection via the elastic net," Journal of the Royal Statistical Society Series B: Statistical Methodology, Apr. 2005, 67(2):301-20.
Office Action in Chinese Appln. No. 202280018581.4, mailed on Apr. 30, 2026, 17 pages (with English translation).

* cited by examiner

GENERATING OUTPUT SIGNALS USING VARIABLE-RATE DISCRETE REPRESENTATIONS

CROSS-REFERENCE TO RELATED APPLICATIONS

This application is a National Stage Application under 35 U.S.C. § 371 and claims the benefit of International Application No. PCT/EP2022/056014, filed Mar. 9, 2022, which claims the benefit of priority to U.S. Provisional Application Ser. No. 63/158,876, filed Mar. 9, 2021, the entirety of which is incorporated herein by reference.

BACKGROUND

This specification relates to using neural networks to generate output signals, e.g., audio signals.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates an audio signal using a generative neural network that generates an event sequence representing a run-length encoding of a discrete representation of the audio signal.

Generally, the output audio signal is an output audio example that includes a sample of an audio wave at each of a sequence of output time steps. The audio sample at a given time step can be an amplitude value of the audio wave or a compressed or companded amplitude value.

This specification also describes a system implemented as computer programs on one or more computers in one or more locations that jointly trains (i) an encoder neural network having encoder parameters and configured to process a representation of an input signal, e.g., an audio signal, an image signal, a video signal, or another type of signal, to generate an encoded representation of the input signal that comprises, for each of a set of one or more channels, a respective encoded value at each of a plurality of representation time steps and (ii) a decoder neural network having decoder parameters and configured to process a discrete representation generated by quantizing the encoded representation of the input signal to generate a prediction of the input signal. Thus, after training, the encoder and decoder neural network can be used to perform compression and reconstruction of audio signals, compression and reconstruction of image signals, compression and reconstruction of video signals, and so on.

The subject matter described in this specification can be implemented in particular embodiments so as to realize one or more of the following advantages.

This specification describes a generative neural network that performs event-based representation modelling of audio signals, i.e., that generates event-based representations of an audio signal that can then be used to reconstruct the audio signal. Thus, the generative neural network can be used to directly generate high-quality audio. As a specific example, the techniques described herein are particularly well suited to generating speech. In particular, the generative neural network can be used to generate grammatical and semantically coherent utterances and continuations without requiring that the system first generate the corresponding text. More specifically, the generative neural network can generate these utterances without requiring any supervision, e.g., by being trained entirely on an unsupervised "language" modeling objective.

Moreover, this specification describes techniques for unsupervised learning of high-level variable-rate discrete representations of sequences. These representations are event-based representations that automatically grow or shrink depending on the density of salient information in the input signals, while still allowing for faithful signal reconstruction. This allows the representations to be used to train the generative neural network described above or for another purpose, e.g., to compress and reconstruct input signals. Furthermore, using event-based representations improves computational efficiently by adapting the amount of computation to the amount of salient information within the input signals. In particular, the described techniques allow for a simple, computationally efficient run-length encoding scheme to be used to compress input signals (by applying run-length encoding to discrete representations generated from encoded representations produced by the encoder neural network) and do not require any fine-tuning or customizing of the encoding scheme to the current signal. Thus, the described techniques achieve a high compression rate and high reconstruction quality while effectively generalizing to a wide variety of different signals.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that uses a generative neural network to generate output audio data.

This specification also describes a training system that trains an encoder neural network and a decoder neural network.

Figure 1:
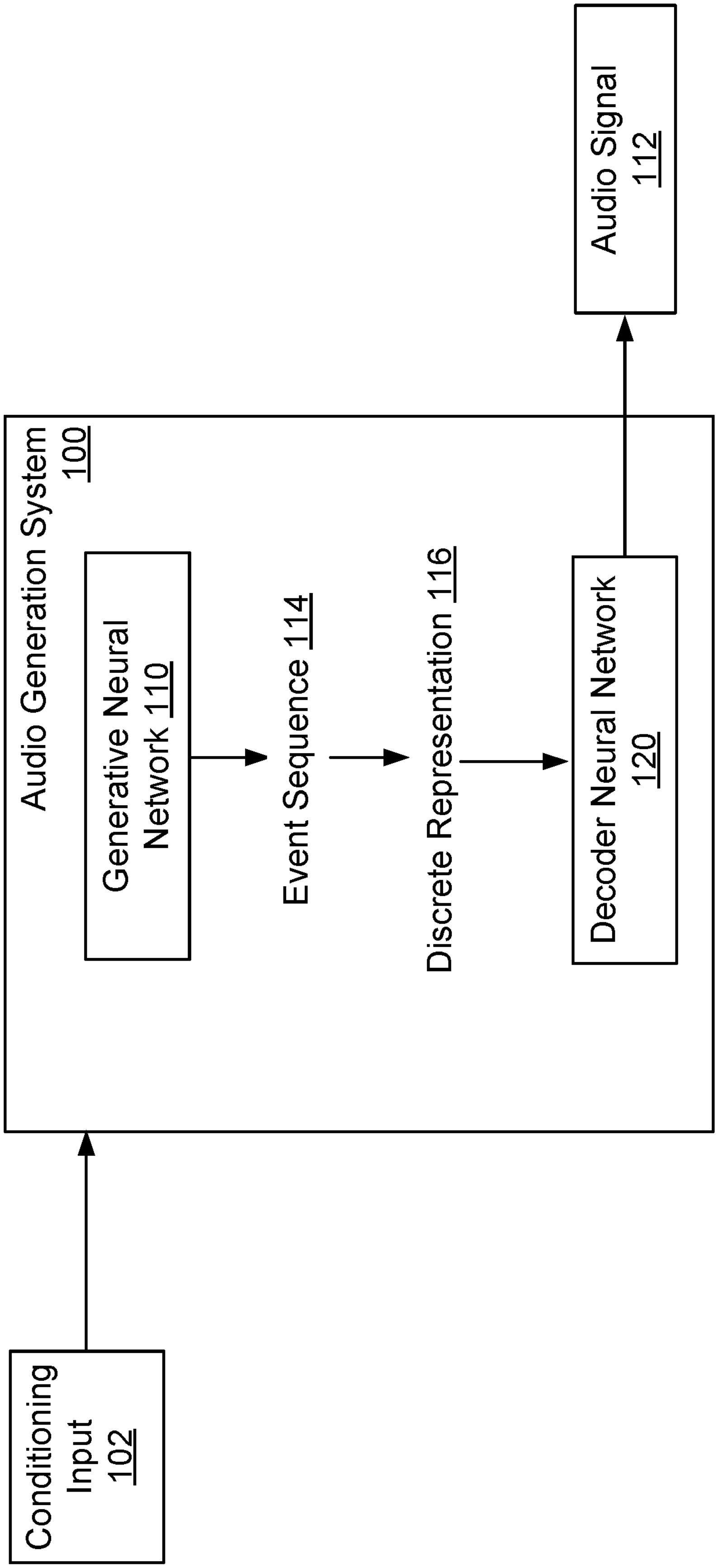
FIG. 1 shows an example audio generation system.

FIG. 1 is a diagram of an example audio generation system 100. The audio generation system 100 is an example of a system implemented as computer programs on one or more computers in one or more locations, in which the systems, components, and techniques described below can be implemented.

The audio generation system 100 generates an output audio signal 112 using a generative neural network 110 and a decoder neural network 120.

Generally, the output audio signal 112 is an output audio example that includes a sample of an audio wave at each of a sequence of output time steps. The audio sample at a given time step can be an amplitude value of the audio wave or a compressed or companded amplitude value of the audio wave.

For example, the audio signal 112 can be a speech signal and the system can generate the speech signal unconditionally, e.g., resulting in a speech signal being generated that is drawn from a distribution represented by the training data set(s) on which the generative neural network 110 and the decoder neural network 120 were trained.

As another example, the audio generation system 100 can receive a context 102 and generate the output audio signal 112 conditioned on the received context 102.

For example, the audio signal 112 can be a speech or other audio signal and the system 100 can generate the audio signal conditioned on a context 102 that is an input audio signal, e.g., resulting in an audio signal being generated that is a prediction of an audio signal that follows the input audio signal. For example, the context 102 can be an input speech signal that is a question that is asked by one speaker and the output audio signal 112 can be an output speech signal that is an answer to the question spoken by the same speaker or another speaker. As another example, the context 102 can be an input speech signal that is a first portion of an utterance spoken by one speaker and the input audio signal 112 can be an output speech signal that is a completion of the utterance spoken by the speaker or by another speaker or a response to the utterance spoken by another speaker.

As another example, the audio signal 112 can be a speech or other audio signal and the system 100 can generate the audio signal conditioned on a context 102 that specifies a topic, e.g., resulting in an audio signal being generated that relates to the specified topic.

To generate a given audio signal 112, the system 100 uses the generative neural network 110 to generate an event sequence 114 representing a run-length encoding of a discrete representation 116 of the audio signal 112.

The system can then apply run-length decoding to the event sequence 114 to generate the discrete representation 116 and process the discrete representation 116 using the decoder neural network 120.

The discrete representation 116 includes, for each of a set of one or more channels, a respective quantized value at each of a plurality of representation time steps. As will be described in more detail below, the values are referred to as "quantized" because they are constrained to only take a value from a relatively small number of quantization levels, e.g., from a set of 9, 14, 21, or 29 quantization levels. The number of representation time steps can be equal to the number of time steps in the audio signal 112 or can be less than the number of time steps in the audio signal 112, i.e., so that the discrete representation 116 represents the audio signal 112 at a lower temporal resolution.

Run-length encoding an input signal that includes a respective value at each time step in a sequence of time steps refers to encoding runs of constant values in the input signal as (value; length)-tuples, where the value in each tuple is the constant value and the length is the number of time steps for which the run continues i.e., the number of consecutive time steps at which the constant value is repeated within the signal. Thus, l repeated instances of the same value v within an input signal will be represented as a (v, l) tuple. Such tuples will also be referred to as "events."

Run-length decoding a run-length encoded input signal refers to reconstructing the signal by, for each event, determining the offset of the event within the input signal, i.e., determining the time step at which the event begins within the input signal, and repeating the "value" in the event starting at the offset and for the number of time steps specified by the "length" in the event within the reconstructed input signal.

When the input signal includes multiple channels of values, i.e., so that each channel includes a respective value at each of the time steps, each channel can be run-length encoded independently, i.e., the event sequence includes interleaved events corresponding to each of the multiple channels. For example, the system 100 can interleave events within the event sequence so that they are ordered by time and then by channel index, resulting in a one-dimensional sequence of events. Given a fixed assignment of channel indices, this ordering is deterministic. As a result, one can recursively infer the channel and offset (position in the discrete representation before run length encoding) for each tuple, given only the sequence of event lengths preceding the tuple.

The event sequence 114, therefore, is a sequence of events that represents the run-length encoding of the discrete representation 116, i.e., a sequence of events arranged according to a pre-determined syntax that allows the discrete representation 116 to be reconstructed using run-length decoding.

The decoder neural network 120 is configured to process the discrete representation 116 of the audio signal to generate the predicted audio signal, i.e., the output audio signal 112.

Generating an event sequence using the generative neural network 110 is described in more detail below with reference to FIGS. 2 and 3.

Generally, the decoder neural network 120 can have any appropriate architecture that maps a discrete representation to a predicted audio signal.

As a particular example, the decoder neural network 120 can be an auto-regressive neural network that auto-regressively generates the prediction of the audio signal while conditioned on a conditioning signal generated from at least the discrete representation. In this example, the decoder neural network 120 can be an auto-regressive convolutional neural network, e.g., a neural network that has a conditional WaveNet architecture. As another example, the decoder neural network 120 can be, e.g., an auto-regressive Transformer.

For example, the decoder neural network 120 can process the discrete representation 116 using a conditioning stack, e.g., a stack of one-dimensional convolutional layers or a stack of self-attention layers, to generate the conditioning signal.

In some cases, when the conditioning input to the system 100 includes a speaker identifier, the decoder neural network 120 can generate the conditioning signal from the discrete representation 116 and the speaker identifier, e.g., from a speaker embedding for the speaker identifier.

Prior to being deployed to generate audio signals, the generative neural network 110 is trained. In particular, the generative neural network 110 is trained on a language modeling objective on a set of event sequences. One example technique for generating the event sequences for use in training the generative neural network 110 is described in more detail below.

In some implementations, the generative neural network 110 is trained so that event sequences generated by the generative neural network 110 represent encodings of high-level variable-rate discrete representations of the audio signals.

A variable-rate representation refers to one that allocates more bits to different portions of an input signal (the rate of bit allocation varies over time). In particular, in the context of this specification, a variable-rate representation is one that is amenable to run-length encoding, i.e., one that is significantly shortened when compressed using run-length encoding. A high-level representation refers to one that captures enough high-level information about the input signal to allow the decoder 120 to accurately reconstruct the input signal.

Prior to being deployed to generate audio signals, the decoder neural network 120 is also trained so that the decoder neural network 120 can accurately reconstruct an input signal from a discrete representation, e.g., a variable-rate, high-level representation of the input signal.

One example technique for training the decoder neural network 120 is described in more detail below with reference to FIGS. 4 and 5.

Figure 2:
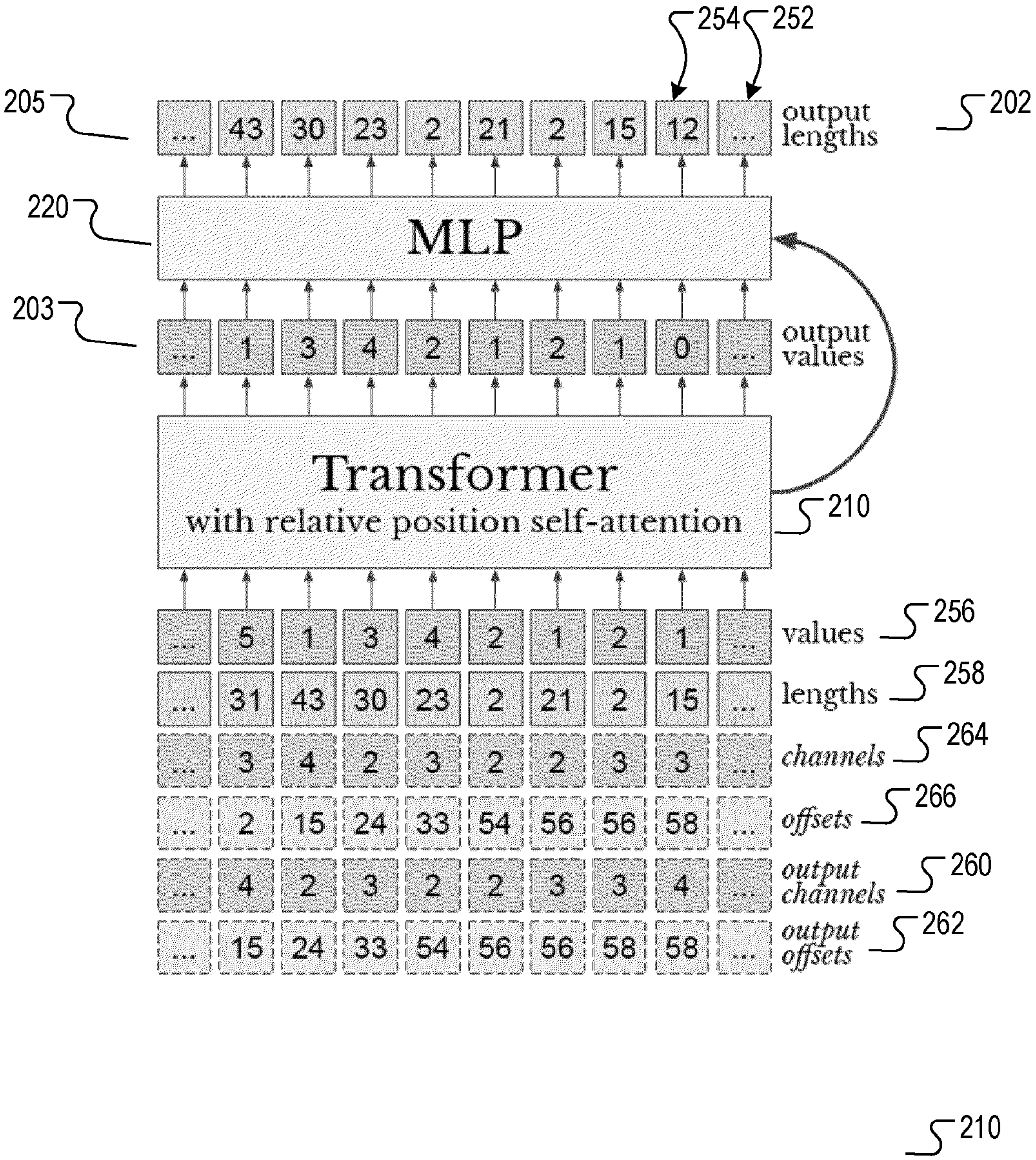
FIG. 2 shows the generation of an event sequence representing a run-length encoding of a discrete representation of an audio signal using the generative neural network.

FIG. 2 shows the generation of an event sequence 202 representing a run-length encoding of a discrete representation of an audio signal using the generative neural network 110.

Once the event sequence 202 is generated, the system 100 can perform run-length decoding on the event sequence 202 to generate the discrete representation and then process the discrete representation using the decoder neural network 120 to generate the audio signal.

As described above, the event sequence 202 includes a respective event at each of a plurality of event sequence time steps.

Each event in the event sequence 202 corresponds to a respective one of a set of one or more channels and to a respective one of the representation time steps in the discrete representation and identifies (i) a respective quantized value 203 at the corresponding representation time step for the corresponding channel and (ii) a respective length value 205 that defines a number of consecutive representation time steps at which the respective quantized value is repeated in the discrete representation. When the discrete representation includes multiple channels, events corresponding to the different channels are interleaved within the event sequence 202 according to a predetermined syntax, e.g., ordered by time, i.e., by discrete representation time step, and then by channel.

Generally, the generative neural network 110 operates auto-regressively. That is, the generative neural network 110 generates each event in the event sequence conditioned on any events that precede the event in the event sequence.

Thus, to generate, using the generative neural network 110, the event sequence 202, the system 100 generates the event at each particular time step of the event sequence time steps by processing a first input for the particular time step that includes a respective embedding of each event at each earlier time step that precedes the particular time step in the event sequence using the generative neural network 110.

As shown in the example of FIG. 2, the generative neural network 110 includes an auto-regressive neural network 210 (a first neural network) that, for each time step in the event sequence, generates the output value by processing the first input for the time step, and a second neural network 220 that, for each time step in the event sequence, generates the output length from at least the output value.

In the example of FIG. 2, the auto-regressive neural network 210 is a Transformer neural network that applies relative position self-attention. Transformers are particularly well suited for modelling event-sequences because they make no assumptions about underlying topology. This is in contrast to convolutional layers, which implicitly assume a fixed sampling interval between consecutive sequence elements. More generally, however, the auto-regressive neural network 210 can be any appropriate neural network that operates auto-regressively, e.g., a recurrent neural network (RNN) or another type of attention-based neural network.

In the example of FIG. 2, the second neural network 220 is a multi-layer perceptron (MLP). More generally, however, the second neural network 220 can be any appropriate neural network that can map an input of the type described below to an output of the type described below. For example, the second neural network 220 can be a convolutional neural network or can also be an auto-regressive neural network.

Utilising a second neural network 220 for predicting output length rather than predicting the output length using the auto-regressive neural network 210 improves computational efficiency. This is because the length of the sequence that the auto-regressive neural network 210 needs to predict is shorter. When an attention mechanism is used (e.g. in a Transformer neural network), reducing the sequence length improves computational efficiency as the computational cost of the attention mechanism scales quadratically with sequence length.

Nevertheless, while FIG. 2 shows that the generative neural network 110 includes two neural networks and that the output length is generated conditioned on the output value, in some other implementations, the generative neural network 110 includes only a single neural network that generates both the output length and the output value in parallel.

When the generative neural network 110 includes the auto-regressive neural network 210 and the second neural network 220, at each particular event time step, the system 100 processes the first input for the time step using the auto-regressive neural network 210 to generate a probability distribution (a first probability distribution) over quantized values, i.e., over the set of values that can be represented by the quantization scheme. For example, the auto-regressive neural network 210 can include multiple hidden layer blocks, e.g., masked self-attention blocks in the case of a Transformer, and an output layer that processes an output of the last self-attention block to generate the probability distribution.

The system 100 then samples the respective quantized value for the event at the particular time step from the (first) probability distribution. For example, the system 100 can sample the respective quantized value for the event at the particular time step from the probability distribution using nucleus sampling or any other appropriate sampling technique. Nucleus sampling refers to selecting the smallest set of samples that have a total probability that exceeds a threshold probability and then sampling from this smallest set in accordance with the probabilities of the samples in the smallest set.

The system 100 then processes a second input that is derived from at least the respective quantized value for the event at the particular time step using the second neural network 220 to generate a probability distribution over length values. Generally, the second input includes at least an embedding of the respective quantized value for the event at the particular time step. Optionally, to provide additional context to the second neural network 220, the second input can also include an intermediate embedding of the event at the most recent earlier time step generated by the auto-regressive neural network 210 while generating the probability distribution over quantized values. For example, the intermediate embedding can be the output of the last hidden layer block in the neural network 210. In some implementations, the second input is a concatenation of these two embeddings. In some other implementations, the intermediate embedding or the embedding of the output value can be provided as a side-input to the second neural network 220.

The system 100 then samples the respective length value for the event at the particular time step from the probability distribution. For example, the system 100 can sample the respective length value for the event at the particular time step from the probability distribution using nucleus sampling or any other appropriate sampling technique.

As described above, the first input for each particular time step includes a respective embedding of each event at each earlier time step that precedes the particular time step in the event sequence.

More specifically, the respective embedding of each event at each earlier time step is a combination of, e.g., a concatenation of, a sum of, or an average of, multiple different embeddings.

In particular, the respective embedding is generated from at least embeddings of the respective value identified by the event and the respective length value identified by the event.

For example, when generating the output value and the output length at time step 252, the respective embedding of the event at the preceding time step 254 is generated from an embedding of the value 256 and an embedding of the length 258 at the preceding time step 254.

Optionally, the respective embedding of any given event can also include additional information.

For example, the embedding of a given event can also be generated from (i) an output channel 260 that specifies the channel to which the next event at the next event sequence time step corresponds, i.e., the event at the time step immediately following the time step of the given event in the event sequence, (ii) an output offset 262 that specifies a representation time step to which the next event at the next event sequence time step corresponds, or both. The representation time step to which an event corresponds is the first time step at which the value in the event appears in the discrete representation.

As another example, the embedding of a given event can also be generated from (i) the channel 264 to which the given event corresponds or (ii) an offset 266 that specifies the representation time step to which the given event corresponds.

In some implementations, the first input can also include additional information in addition to the embeddings of the preceding events in the event sequence 202.

For example, when the context provided to the system 100 is an input audio signal and the prediction of the audio signal being generated by the system 100 is a prediction of an audio signal that follows the input audio signal, the first input can include a respective embedding for each event in an input event sequence that represents the first audio signal. The event sequence can be generated by run-length encoding an encoded representation of the first audio signal generated by a trained encoder neural network, e.g., the encoder neural network 410 of FIG. 4.

As another example, when the context provided to the system 100 is a topic and the prediction of the audio signal being generated by the system 100 is a prediction of an audio signal that includes speech about the topic, the respective embedding of each event at each earlier time step that precedes the particular time step can be generated in part from an embedding of the topic.

Figure 3:
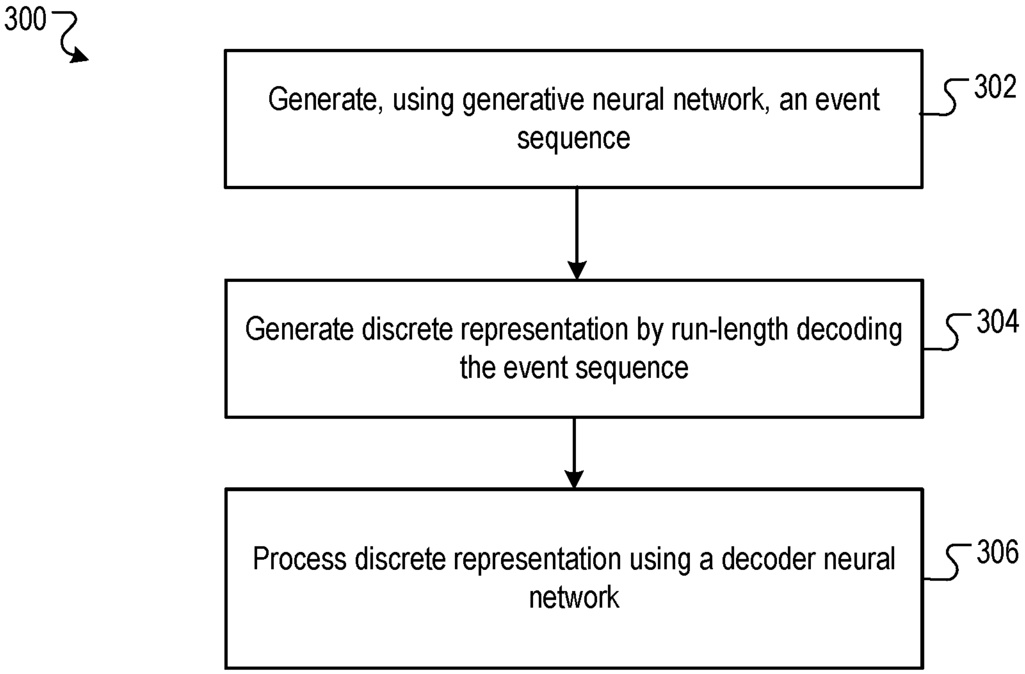
FIG. 3 is a flow diagram of an example process for generating an audio signal.

FIG. 3 is a flow diagram of an example process 300 for generating an audio signal. For convenience, the process 300 will be described as being performed by a system of one or more computers located in one or more locations. For example, an audio generation system, e.g., the audio generation system 100 of FIG. 1, appropriately programmed in accordance with this specification, can perform the process 300.

The system generates, using a generative neural network, an event sequence representing a run-length encoding of a discrete representation of the audio signal (step 302). As described above, the event sequence includes a respective event at each of a plurality of event sequence time steps. In some implementations, the system generates the event sequence unconditionally. In some other implementations, the system generates the event sequence conditioned on a conditioning input.

The system generates the discrete representation of the audio signal from the event sequence using run-length decoding (step 304). That is, the system run-length decodes the event sequence to generate the discrete representation.

The system processes the discrete representation using a decoder neural network (step 306). The decoder neural network is configured to process the discrete representation of the audio signal to generate the prediction of the audio signal.

Figure 4:
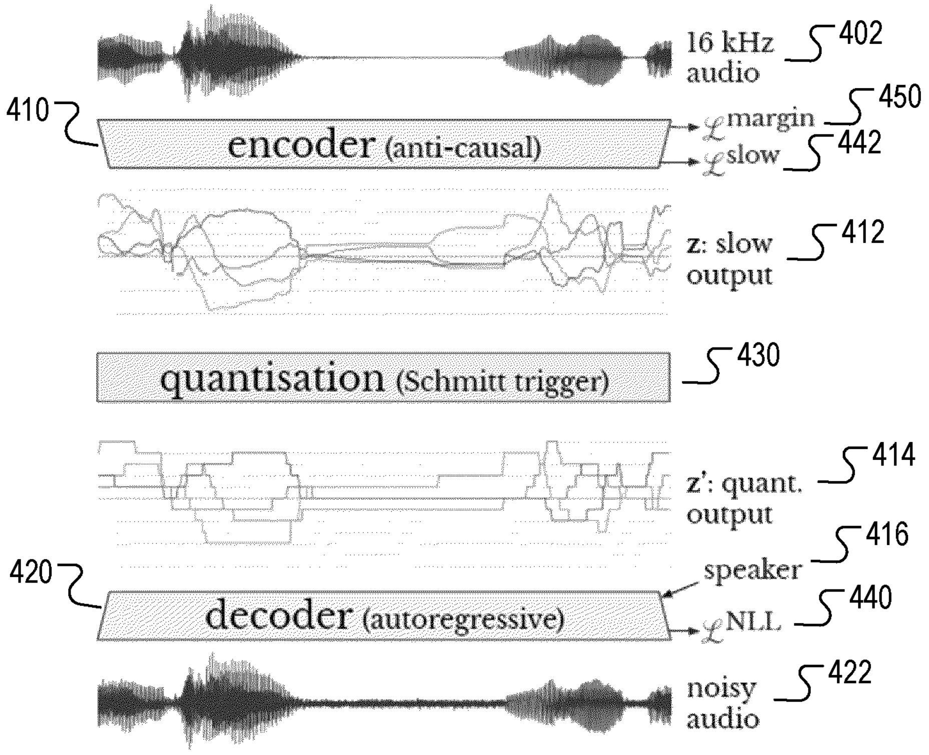
FIG. 4 shows the training of an encoder neural network and a decoder neural network by a training system.

FIG. 4 shows the training of an encoder neural network 410 and a decoder neural network 420 by a training system 400.

In some implementations, the decoder neural network 420 is the same as the decoder neural network 120, i.e., the decoder neural network 120 is trained jointly with the encoder neural network 410 as described below.

In some other implementations, the decoder neural network 120 is trained using a different training schedule, e.g., jointly with a different encoder neural network on a different loss function than is described below.

The training system 400 can be the same system as the system 100 of FIG. 1 or can be a different training system implemented as one or more computer programs in one or more locations.

More specifically, the training system 400 jointly trains the encoder neural network 410 and the decoder neural network 420.

The encoder neural network 410 has parameters (referred to as "encoder parameters") and is configured to process a representation of an input signal, e.g., an audio signal, an image signal, a video signal, or another type of signal, to generate an encoded representation 412 (also referred to as a "slow output" z) of the input signal that includes, for each of a set of one or more channels, a respective encoded value at each of a plurality of representation time steps.

Optionally, the encoder 410 can be anti-causal, i.e., can use information about future values, by enforcing anti-causality. For example, the system 400 can shift input signals left, i.e., backward in time, by one or more time steps to introduce this anti-causality. This can ensure that the learnt representation captures information about the future of the signal at each point.

The encoder 410 can have any appropriate neural network architecture that can map input signals to encoded representations. For example, the encoder 410 can be a convolutional neural network that, in some cases, employs anti-causal convolutions or a Transformer encoder neural network.

In the example of FIG. 4, the input signal is an audio signal 402 sampled at a frequency of 16 kHz and the encoded representation 412 has four channels.

To generate the input to the decoder neural network 420, the training system 400 performs quantization 430 to generate a discrete representation 414 (also referred to as a "quantized output" z'). That is, the training system 400 quantizes each encoded value in the encoded representation 412 to generate the discrete representation 414.

As used in this specification, quantizing a value refers to approximating the value using a value from a reduced set of values. That is, the encoded values are generated in a number format, e.g., floating point, that has a larger set of possible values than the number format used to represent the quantized values. For example, the encoded values can be represented in an 8-bit number format while the quantized values can be constrained to take only take a value from a set of 9, 14, 21, or 29 quantization levels.

For example, the training system 400 can quantize a given encoded value by assigning the encoded value to the quantized value that is closest to the encoded value (the nearest quantized value). This may be achieved by multiplying the encoded value by a scaling factor to generate a scaled factor, rounding the scaled factor to the nearest integer, and then dividing the rounded value by the scaling factor to generate the quantized value.

However, this approach can result in the quantized values in the discrete representation 414 rapidly jumping back and forth between levels. That is, due to noise, these values occasionally straddle the boundary between quantization levels, and this means that many more events will be required to describe the resulting sequences after run-length encoding.

To account for this, the system 400 can quantize the encoded values using "Schmitt trigger" quantization.

In particular, in this scheme, for each channel, the system 400 quantizes the encoded values in the encoded representation for the channel by quantizing the first encoded value as described above to generate a quantized value and then, for each subsequent representation time step determining whether the encoded value for the channel at the representation time step is more than a threshold amount m different from the quantized value for the channel at the preceding representation time step.

In response to determining that the encoded value for the channel is not more than the threshold amount m different, the system 400 assigns the encoded value for the channel at the representation time step to the same value as the quantized value for the channel at the preceding representation time step.

In response to determining that the encoded value for the channel is more than the threshold amount m different, the system 400 assigns the encoded value for the channel at the representation time step to a nearest quantized value of the fixed number of quantized values, i.e., by quantizing the value as described above.

Generally, different encoded representations (and discrete representations) for different input signals can have different numbers of representation time steps, i.e., the number of time steps in "the plurality of representation time steps" can be different for different signals.

The decoder neural network 420 has parameters (referred to as "decoder parameters") and is configured to process the discrete representation 414 generated by quantizing the encoded representation 412 of the input signal to generate a prediction of the input signal ("noisy input").

In the example of FIG. 4, because the input signal is an audio signal 402, the prediction is noisy audio 422. Optionally, as described above, the decoder neural network 420 can also be conditioned on a speaker 416 when generating the audio 422.

In particular, the system 400 trains the encoder and decoder neural networks 410 and 420 so that the discrete representations are high-level variable-rate discrete representations of the input sequence and so that the decoder is able to accurately reconstruct an input signal from the discrete representation of the input signal generated by quantizing the encoded representation generated by the encoder by processing the input signal.

A variable-rate representation refers to one that allocates more bits to different portions of an input signal. A high-level representation refers to one that captures enough high-level information about the input signal to allow the decoder to accurately reconstruct the input signal. A discrete representation refers to one that has quantized values, i.e., values that can take fewer possible values (e.g. significantly fewer possible values) than the values in the input signal, as described above.

During the training, the training system 400 updates the encoder parameters and the decoder parameters by computing gradients with respect to the encoder parameters and the decoder parameters of a loss function.

The loss function includes (i) a first term 440 and (ii) a second term 442.

The first term 440 measures, for each training signal, a quality, relative to the training signal, of the prediction of the training signal generated by the decoder neural network by processing the discrete representation generated by quantizing the encoded representation generated by the encoder neural network by processing the representation of the training signal. For example, as shown in in FIG. 4, the first term 440 can be a negative log likelihood (NLL) loss that measures the negative log likelihood assigned to training signal by the outputs of the decoder neural network 420.

In some implementations, the system 400 can inject noise, e.g., Gaussian noise, into the training signal before computing the first term 440.

The second term 442 ($L^{slow}$) is a slowness term that penalizes, for each training signal and for each of the set of one or more channels, changes between encoded values at adjacent representation time steps in the encoded representation generated by the encoder neural network by processing the representation of the training signal. That is, this term encourages the sequences produced by the encoder to be able to be represented with as few events as possible when run-length encoding is performed.

The second term 442 can impose this "slowness" penalties using any of a variety of measures of change between adjacent encoded values.

As one example, the slowness penalty can be an L2 slowness penalty that is an average of, for each encoded value for each of a plurality of the representation time steps, e.g., each of the representation time steps other than the last time step for each channel, the square of the difference between the encoded value and the encoded value at the immediately following time step for the channel. That is, the slowness penalty $L^{slow}$ can satisfy:

$$\frac{1}{(T-1)C}\sum_{t=1}^{T-1}\sum_{c=1}^{C}(z_{t+1,c}-z_{t,c})^2,$$

where T is the total number of representation time steps, C is the number of channels, $z_{t,c}$ is the encoded value for channel c at representation time step t, and $z_{t+1,c}$ is the encoded value for channel c at representation time step t+1.

As another example, the slowness penalty can be an L1 slowness penalty that is an average of, for each encoded value for each for each of a plurality of the representation time steps, e.g., each of the representation time steps, other than the last time step for each channel, the absolute value of the difference between the encoded value and the encoded value at the immediately following time step for the channel. That is, the slowness penalty $L^{slow}$ can satisfy:

$$\frac{1}{(T-1)C}\sum_{t=1}^{T-1}\sum_{c=1}^{C}|z_{t+1,c}-z_{t,c}|$$

where T is the total number of representation time steps, C is the number of channels, $z_{t,c}$ is the encoded value for channel c at representation time step t, and $z_{t+1,c}$ is the encoded value for channel c at representation time step t+1.

Using the L1 slowness penalty can encourage the encoded values to change in bursts rather than gradually over time in smaller increments.

However, in some cases, using the L1 slowness penalty may cause one or more of the channels of the encoded representation to collapse to zero (since an all zero channel minimizes the L1 slowness penalty).

As yet another example, to address this, the second term can act as an L1 penalty across the sequence dimension while acting as an L2 penalty across all other dimensions.

In particular, the second term can be proportional to a square of a sum of respective channel dimension changes for each of a plurality of the representation time steps, e.g., each of the representation time steps other than the last time step. A channel dimension change for a given representation time step is equal to a square root of a sum of, for each channel, a squared distance between (i) the encoded value for the channel at the given representation time step and (ii) the encoded value for the channel at a next representation time step that immediately follows the given representation time step. That is, the slowness penalty $L^{slow}$ can satisfy:

$$\frac{1}{(T-1)C}\left(\sum_{t=1}^{T-1}\sqrt{\sum_{c=1}^{C}(z_{t+1,c}-z_{t,c})^2}\right)^2$$

where T is the total number of representation time steps, C is the number of channels, $z_{t,c}$ is the encoded value for channel c at representation time step t, and $z_{t+1,c}$ is the encoded value for channel c at representation time step t+1.

In some implementations, the loss function used for the joint training also includes a third term 450.

The third term 450 is a margin loss term that penalizes the encoder neural network for generating encoded values that are outside of the valid range for the quantization, i.e., that are larger than the largest representable value in the quantization scheme or smaller than the smallest representable value in the quantized scheme. For example, when the valid range for the quantization is [−a,a], the margin loss can be equal to the sum over all encoded values of the square of the maximum between (i) zero and (ii) the absolute value of the encoded value minus a.

Generally, the loss function is a weighted sum of the first term, the second term, and, when used, the third term.

In some implementations, the weights for the terms are constant.

In some other implementations, the system keeps the weights for the first term and, when used, the third term constant, and adaptively varies the weight for the second term during training to cause the encoder neural network to achieve a predetermined target event rate after the discrete representations are run-length encoded to generate event sequence. An "event" rate for a given event sequence is the ratio of the number of events in the sequence to the length of the input signal that the event sequence encodes.

In particular, at specified intervals during the training, e.g., at every training step or at every n-th training step, the system 400 updates the weight for the second term to achieve the target rate.

For example, the system 400 can update the weight for the second term based on (i) an average event rate of the discrete representations for the batch of training inputs for the training step and (ii) the predetermined target event rate. The system 400 can compute the average event rate by counting, for each discrete representation generated from one of the encoded representations and for each channel of the discrete representation, a number of changes in quantized values between adjacent representation time steps in the discrete representation, and computing the average of the counts.

As a particular example, the system 400 can update the weight λ at training step k as follows:

$$\lambda_{k+1}=\begin{cases}(1+\delta)\lambda_k & \text{if } \hat{R}_k>(1+\epsilon)R_T\\ (1+\delta)^{-1}\lambda_k & \text{if } \hat{R}_k<(1+\epsilon)^{-1}R_T\\ \lambda_k & \text{otherwise}\end{cases}$$

where $\hat{R}_k$ is the average event rate computed from the training examples at training step k, $R_T$ is the target event rate, and δ and ε are hyperparameters that control the rate of change of the weight and the tolerance with the respect to the average event rate.

By updating the weight for the second term based on the average event rate and the target event rate, the system 400 maintains a low average event rate of learnt representation while still allowing for faithful reconstruction of the input signals. Maintaining a low average event rate results in shorter run length encoded sequence, increasing the power of the compression.

In some cases, the generative neural network 110 can then be trained on event sequences generated from discrete representations generated by quantizing the encoded representation generated by the trained encoder by processing audio signals in a set of training data. That is, the event sequences on which the generative neural network 110 is trained can be generated by processing audio signals in a set of training data using the trained encoder, and then quantizing and run-length encoding the resulting representations as described above.

Additionally, in some cases, the decoder 420 that is trained jointly with the encoder 410 can then be used to generate audio signals from the outputs of the generative neural network. In some other cases, a different decoder can be trained, i.e., without being trained jointly with the encoder 410, and then used to generate the audio signals from the outputs of the generative neural network. For example, a more powerful decoder 420 can be trained to map discrete representations generated from outputs of the trained encoder 410 to corresponding audio signals.

Figure 5:
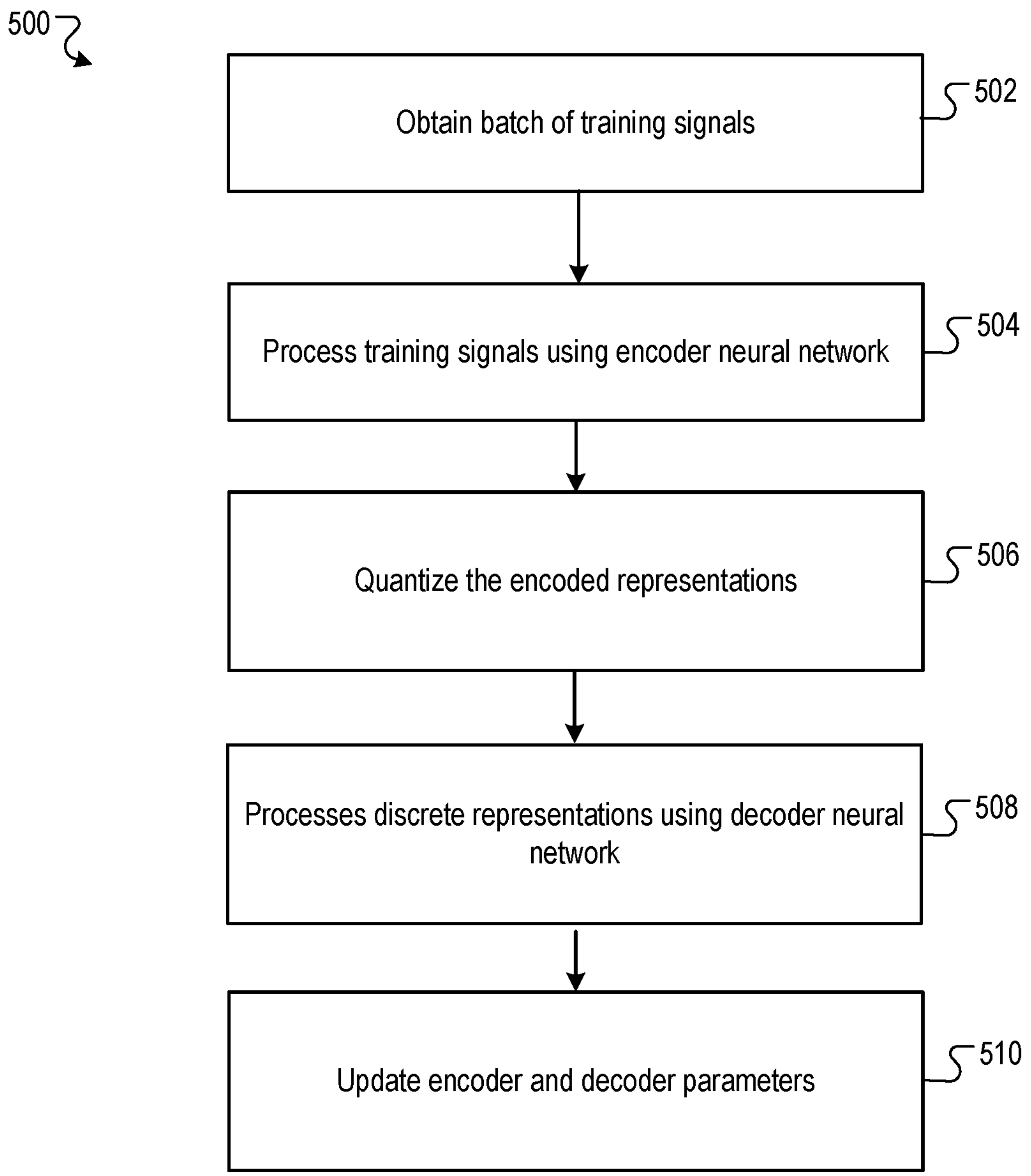
FIG. 5 is a flow diagram of an example process for training an encoder neural network and a decoder neural network.

FIG. 5 is a flow diagram of an example process 500 for training an encoder neural network and a decoder neural network. For convenience, the process 500 will be described as being performed by a system of one or more computers located in one or more locations. For example, a training system, e.g., the training system 500 of FIG. 5, appropriately programmed in accordance with this specification, can perform the process 500.

For example, the system can repeatedly perform iterations of the process 500 on different batches of training data to train the encoder neural network 510 and the decoder neural network 520 of FIG. 5.

The system obtains a batch of one or more training signals (step 502).

For each training signal, the system processes the training signal using the encoder network to generate an encoded representation of the training signal (step 504). The encoder representation includes, for each of a set of one or more channels, a respective encoded value at each of a plurality of representation time steps.

For each training signal, the system quantizes the encoded representation to generate a discrete representation of the training signal (step 506). The discrete representation includes, for each of the set of one or more channels, a respective quantized value at each of the plurality of representation time steps.

For each training signal, the system processes the discrete representation using the decoder neural network to generate a prediction of the training signal (step 508).

The system updates the encoder parameters and the decoder parameters by computing gradients with respect to the encoder parameters and the decoder parameters of a loss function (step 510). That is, the system computes, through backpropagation, gradients with respect to the encoder parameters and the decoder parameters of the loss function described above with reference to FIG. 5 (and evaluated at the training signals in the batch). In particular, the system can compute gradients with respect to the encoder parameters of the encoder neural network and the decoder neural network of the loss function and then apply an appropriate optimizer to the gradients, e.g., an Adam optimizer, an rmsProp optimizer, an Adafactor optimizer, a stochastic gradient descent (SGD) optimizer, and so on, to update the encoder parameter and the decoder parameters.

Because the quantization operation performed in step 506 is not differentiable and cannot be backpropagated through, the system can approximate the gradients of the first term, i.e., the term that measures the quality of the prediction generated by the decoder neural network, with respect to the encoder parameters using straight through estimation. During backpropagation, straight through estimation allows the estimation of the gradient for a quantization operation by setting output gradients at the quantization operation to be equal to the input gradients at the quantization operation (bypassing the quantization operation during backpropagation).

Figure 6:
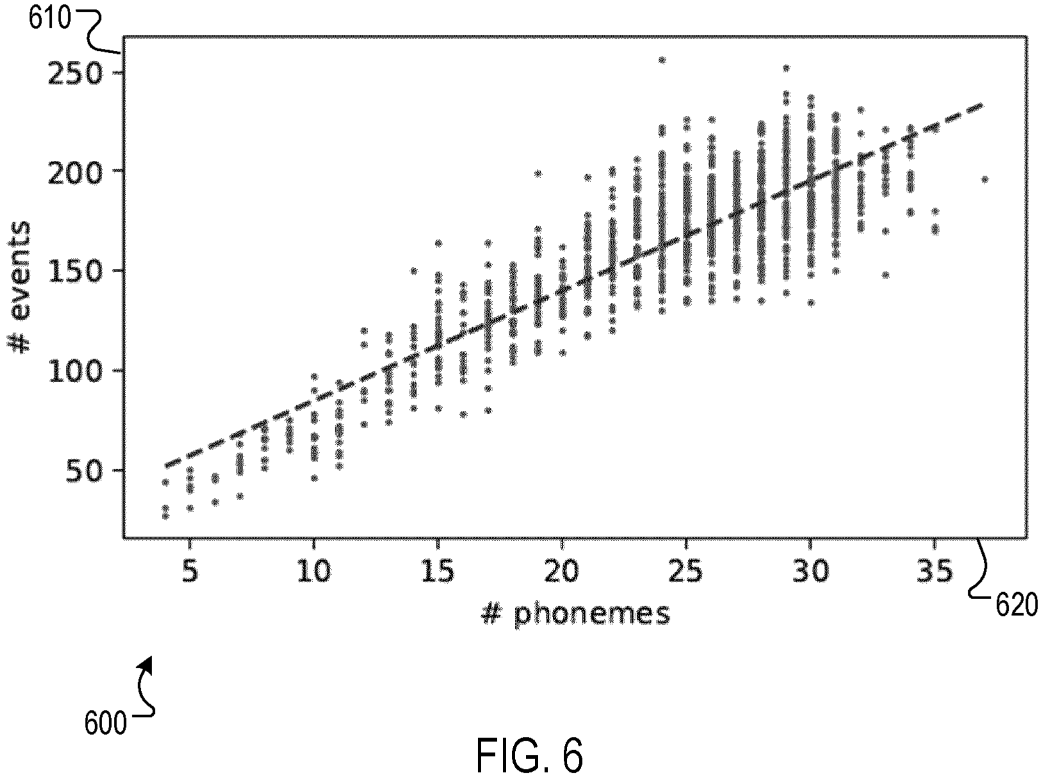
FIG. 6 is a scatter plot that shows event sequence lengths on one axis and numbers of phonemes on the other axis.

FIG. 6 is a scatter plot 600 that shows event sequence lengths on one axis, i.e., the y axis 610, and numbers of phonemes on the other axis, i.e., the y axis 620.

In particular, the scatter plot 600 is a scatter plot of event sequence lengths vs number of phonemes for a set of 1024 speech signals from a data set of speech signals. The event sequence length for a speech signal is the number of events in an event sequence generated as a result of processing the speech signal using the trained encoder neural network. The number of phonemes for a speech signal is a number of phonemes in a transcription of the speech signal.

As can be seen in FIG. 6, there is a strong correlation despite the fact that the representation learning procedure, i.e., the training described above with reference to FIGS. 4 and 5, is entirely unsupervised. Thus, this shows that the encoder neural network learns to consistency allocate more bits to more complicated input signals and fewer bits to less complicated input signals.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for generating a prediction of an audio signal, the method comprising:

generating, using a generative neural network, an event sequence representing a run-length encoding of a discrete representation of the audio signal, the event sequence comprising a respective event at each of a plurality of event sequence time steps, wherein the discrete representation comprises, for each of a set of one or more channels, a respective quantized value at each of a plurality of representation time steps, wherein each event in the event sequence corresponds to a respective one of the set of one or more channels and to a respective one of the plurality of representation time steps and identifies (i) a respective quantized value at the corresponding representation time step for the corresponding channel and (ii) a respective length value that defines a number of consecutive representation time steps at which the respective quantized value is repeated in the discrete representation;

generating the discrete representation of the audio signal from the event sequence using run-length decoding; and processing the discrete representation using a decoder neural network, wherein the decoder neural network is configured to process the discrete representation of the audio signal to generate the prediction of the audio signal.

2. The method of claim 1, further comprising:

receiving a context for the audio signal, wherein generating, using the generative neural network, the event sequence, comprises:

conditioning the generative neural network on the context.

3. The method of claim 2, wherein the context is an input audio signal and wherein the prediction of the audio signal is a prediction of an audio signal that follows the input audio signal.

4. The method of claim 2, wherein the context identifies a topic for speech represented in the input audio signal.

5. The method of claim 1, further comprising:

receiving data characterizing a speaker whose speech is represented in the audio signal; and conditioning the decoder neural network on the data characterizing the speaker.

6. The method of claim 1, wherein the generative neural network operates auto-regressively and wherein generating, using the generative neural network, an event sequence comprises, for each particular time step of the event sequence time steps:

processing a first input comprising a respective embedding of each event at each earlier time step that precedes the particular time step in the event sequence using the generative neural network to generate the event at the particular time step.

7. The method of claim 6, wherein the respective embedding of each event at each earlier time step is generated from at least embeddings of the respective value identified by the event and the respective length value identified by the event.

8. The method of claim 7, wherein the respective embedding of each event at each earlier time step is generated from at least one or more of: embeddings of (i) an output channel that specifies a channel to which a next event at a next event sequence time step corresponds or (ii) an output offset that specifies a representation time step to which the next event at the next event sequence time step corresponds, wherein the next event sequence time step immediately follows the earlier time step in the event sequence.

9. The method of claim 7, wherein the respective embedding of each event at each earlier time step is generated from at least embeddings of one or more of (i) the channel to which the event corresponds or (ii) the representation time step to which the event corresponds.

10. The method of claim 6, wherein processing a first input comprising a respective embedding of each event at each earlier time step that precedes the particular time step in the event sequence using the generative neural network to generate the event at the particular time step comprises:

processing the first input comprising the respective embeddings of each event at each earlier time step using an auto-regressive neural network to generate a first probability distribution over quantized values;

sampling the respective quantized value for the event at the particular time step from the first probability distribution;

processing a second input comprising the respective quantized value for the event at the particular time step using a second neural network to generate a second probability distribution over length value; and sampling the respective length value for the event at the particular time step from the second probability distribution.

11. The method of claim 10, wherein the auto-regressive neural network is a Transformer.

12. The method of claim 10, wherein the second neural network is a feedforward neural network.

13. The method of claim 12, wherein the second neural network is a multi-layer perceptron (MLP).

14. The method of claim 10, wherein the second input further comprises an intermediate embedding of the event at the most recent earlier time step generated by the autoregressive neural network while generating the first probability distribution over quantized values.

15. The method of claim 10, wherein sampling the respective quantized value for the event at the particular time step from the first probability distribution comprises sampling the respective quantized value for the event at the particular time step from the first probability distribution using nucleus sampling.

16. The method of claim 10, wherein sampling the respective length value for the event at the particular time step from the second probability distribution comprises sampling the respective length value for the event at the particular time step from the second probability distribution using nucleus sampling.

17. The method of claim 6, wherein the context is an input audio signal and wherein the prediction of the audio signal is a prediction of an audio signal that follows the input audio signal, and wherein the first input further comprises a respective embedding for each event in an input event sequence that represents the input audio signal.

18. The method of claim 6, wherein the context identifies a topic for speech represented in the input audio signal, and wherein the respective embedding of each event at each earlier time step that precedes the particular time step is generated in part from an embedding of the topic.

19. The method of claim 1, wherein the decoder neural network is an auto-regressive neural network that auto-regressively generates the prediction of the audio signal while conditioned on a conditioning signal generated from at least the discrete representation.

20. The method of claim 19, further comprising:

generating the conditioning signal, comprising: processing the discrete representation using a conditioning stack.

21. The method of claim 19, wherein the decoder neural network is an auto-regressive convolutional neural network.

22. A computer-implemented method for jointly training (i) an encoder neural network having encoder parameters and configured to process a representation of an input signal to generate an encoded representation of the input signal that comprises, for each of a set of one or more channels, a respective encoded value at each of a plurality of representation time steps and (ii) a decoder neural network having decoder parameters and configured to process a discrete representation generated by quantizing the encoded representation of the input signal to generate a prediction of the input signal, the method comprising repeatedly performing operations comprising:

obtaining a batch of one or more training signals;

for each training signal:

processing the training signal using the encoder network to generate an encoded representation of the training signal that comprises, for each of the set of one or more channels, a respective encoded value at each of the plurality of representation time steps;

quantizing the encoded representation to generate a discrete representation of the training signal that comprises, for each of the set of one or more channels, a respective quantized value at each of the plurality of representation time steps; and processing the discrete representation using the decoder neural network to generate a prediction of the training signal; and updating the encoder parameters and the decoder parameters by computing gradients with respect to the encoder parameters and the decoder parameters of a loss that comprises:

(i) a first term that measures, for each training signal, a quality, relative to the training signal, of the prediction of the training signal generated by the decoder neural network by processing the discrete representation generated by quantizing the encoded representation generated by the encoder neural network by processing the representation of the training signal; and (ii) a second term that penalizes, for each training signal and for each of the set of one or more channels, changes between encoded values at adjacent representation time steps in the encoded representation generated by the encoder neural network by processing the representation of the training signal.

23. The method of claim 22, wherein quantizing the encoded representation comprises assigning each encoded value to one of a fixed number of quantized values.

24. The method of claim 23, wherein quantizing the encoded representation comprises, for each channel, quantizing the encoded values in the encoded representation for the channel by, for each representation time step:

determining whether the encoded value for the channel at the representation time step is more than a threshold amount different from the quantized value for the channel at the preceding representation time step; and in response to determining that the encoded value for the channel is not more than the threshold amount different, assigning the encoded value for the channel at the representation time step to the same value as the quantized value for the channel at the preceding representation time step.

25. The method of claim 24, wherein quantizing the encoded representation further comprises, for each channel, quantizing the encoded values in the encoded representation for the channel by, for each representation time step:

in response to determining that the encoded value for the channel is more than the threshold amount different, assigning the encoded value for the channel at the representation time step to the same value to a nearest quantized value of the fixed number of quantized values.

26. The method of claim 22, wherein the loss further comprises:

a third term that penalizes, for each training audio signal, encoded values that fall outside a valid range for the quantized values.

27. The method of claim 22, wherein the second term is proportional to a square of a sum of respective channel dimension changes for each of a subset of the plurality of representation time steps, wherein the respective channel dimension change for a given representation time step is equal to a square root of a sum of, for each channel, a squared distance between (i) the encoded value for the channel at the given representation time step and (ii) the encoded value for the channel at a next representation time step that immediately follows the given representation time step.

28. The method of claim 22, wherein the loss assigns a weight to the second term, and wherein the operations further comprise:

updating the weight based on (i) an average event rate of the discrete representations for the batch of training inputs and (ii) a predetermined target event rate.

29. The method of claim 28, wherein the average event rate is based on, for each discrete representation and for each channel, a number of changes in quantized values between adjacent representation time steps in the discrete representation.

30. The method of claim 22, wherein updating the encoder parameters and the decoder parameters by computing gradients with respect to the encoder parameters and the decoder parameters of the loss comprises:

approximating gradients of the first term with respect to the encoder parameters using straight through estimation.

31. The method of claim 22, wherein the input signals and the training signals are audio signals.

32. The method of claim 22, wherein the set of one or more channels comprises a plurality of channels.

33. The method of claim 22, wherein the decoder neural network is an auto-regressive neural network that auto-regressively generates the prediction of the input signal while conditioned on a conditioning signal generated from at least the discrete representation of the input signal.

34. The method of claim 33, further comprising:

generating the conditional signal, comprising: processing the discrete representation using a conditioning stack.

35. A system comprising one or more computers and one or more storage devices storing instruction that when executed by the one or more computers cause the one or more computers to perform operations for generating a prediction of an audio signal, the operations comprising:

generating, using a generative neural network, an event sequence representing a run-length encoding of a discrete representation of the audio signal, the event sequence comprising a respective event at each of a plurality of event sequence time steps, wherein the discrete representation comprises, for each of a set of one or more channels, a respective quantized value at each of a plurality of representation time steps, wherein each event in the event sequence corresponds to a respective one of the set of one or more channels and to a respective one of the plurality of representation time steps and identifies (i) a respective quantized value at the corresponding representation time step for the corresponding channel and (ii) a respective length value that defines a number of consecutive representation time steps at which the respective quantized value is repeated in the discrete representation;

generating the discrete representation of the audio signal from the event sequence using run-length decoding; and processing the discrete representation using a decoder neural network, wherein the decoder neural network is configured to process the discrete representation of the audio signal to generate the prediction of the audio signal.

36. The system of claim 35, the operations further comprising:

receiving a context for the audio signal, wherein generating, using the generative neural network, the event sequence, comprises:

conditioning the generative neural network on the context.

37. The system of claim 1, the operations further comprising:

receiving data characterizing a speaker whose speech is represented in the audio signal; and conditioning the decoder neural network on the data characterizing the speaker.

* * * * *